Jan. 11, 1966     T. A. ARMAO     3,228,400
CRYOGENIC CAPSULE PROBES
Filed Dec. 3, 1962     2 Sheets-Sheet 1
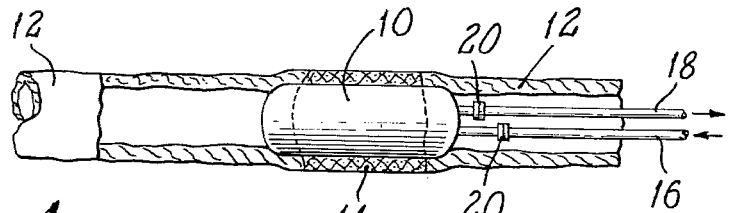
Fig. 1.
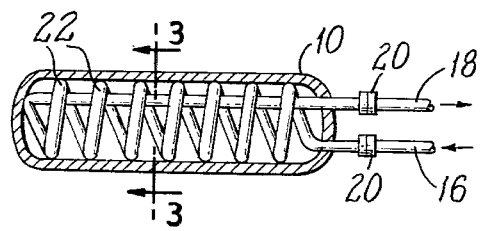
Fig. 2.
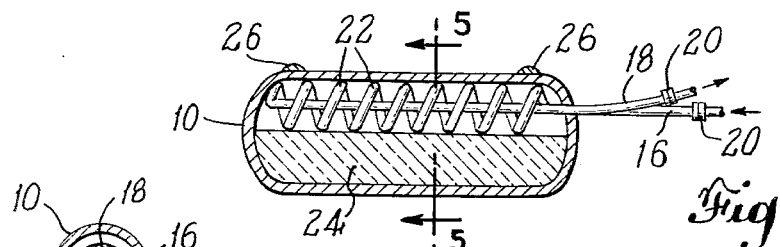
Fig. 4.
Fig. 3.
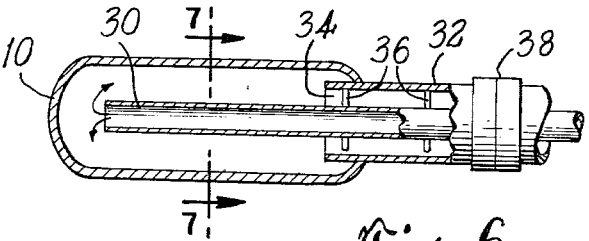
Fig. 6.
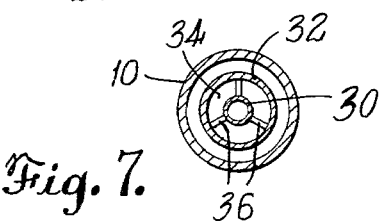
Fig. 5.
Fig. 7.
INVENTOR.
THOMAS A. ARMAO
BY J. Hart Evans
ATTORNEY Jan. 11, 1966  T. A. ARMAO  3,228,400
CRYOGENIC CAPSULE PROBES
Filed Dec. 3, 1962   2 Sheets-Sheet 2
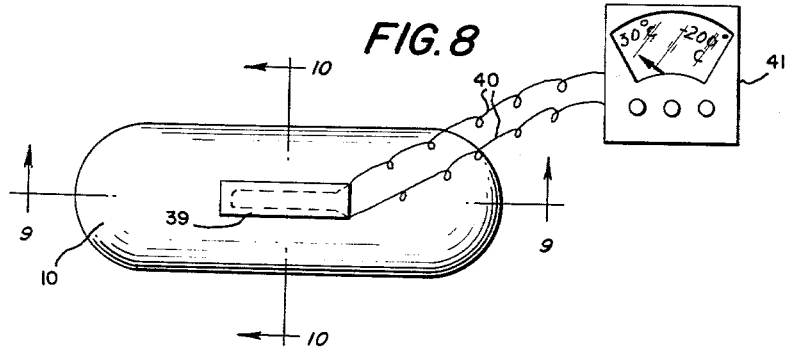
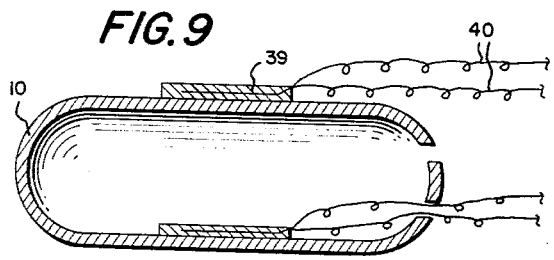
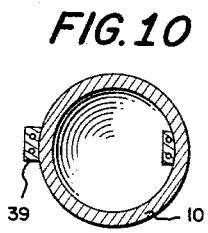
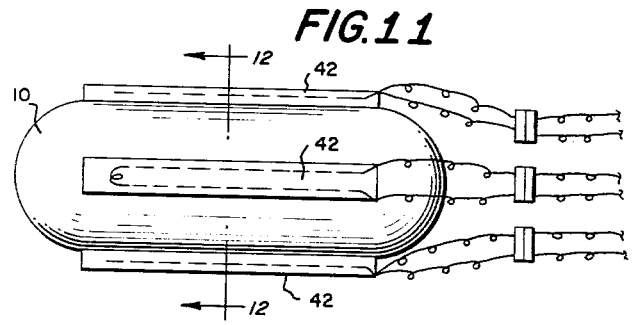
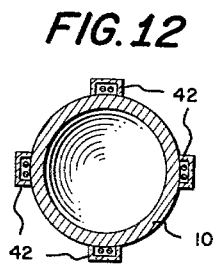
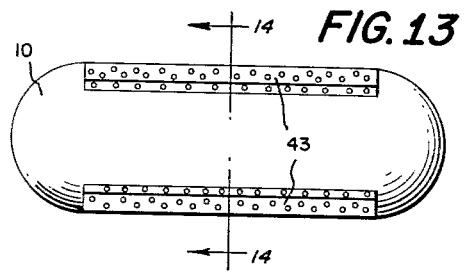
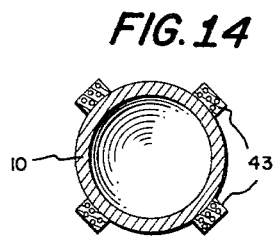
INVENTOR
THOMAS A. ARMAO
BY *Wenderoth, Lind and Ponack*  ATTORNEYS

United States Patent Office 3,228,400
Patented Jan. 11, 1966

3,228,400
CRYOGENIC CAPSULE PROBES
Thomas A. Armao, 1 78th St., Brooklyn, N.Y.
Filed Dec. 3, 1962, Ser. No. 242,019
8 Claims. (Cl. 128—303.1)

This invention relates to an instrument for cryogenic surgery. It is a continuation-in-part of my copending application Serial No. 134,733, filed Aug. 29, 1961, and now abandoned. More particularly the invention relates to a capsule of a size such as to permit its introduction into ducts, lumens and cavities of an animal or human body. The capsule has attached trailing tubes through which a cooling fluid can be introduced into and exhausted from the capsule, thereby cooling the capsule surface to any desired degree.

In the surgical treatment of diseases of the colon or large intestine, particularly cancers thereof, it is frequently necessary to dissect out and remove a portion of the colon. If a malignancy is present, this dissection can result in the metastasizing or release of malignant cells into healthy tissue. This metastasizing can be avoided, however, if the diseased portion of the intestine is cooled or frozen prior to cutting. Cooling of the diseased portion of the intestine causes stasis of the area, thereby rendering the malignant cells immobile by inhibiting the activity and movement of fluids in the tissue and thus preventing spread of the malignancy. While cooling to a degree of stasis is ordinarily sufficient it is possible to actually freeze the afflicted tissue much below 0° C. thereby rendering it harmless for a prolonged period of time. Freezing at sufficiently low temperatures will destroy cancer cells but it is doubtful whether it can destroy cancer viruses if such exist within a cell. It does however render the tissue hard and immobile and it reduces to an absolute minimum the danger of spillage of malignant cells into healthy tissue.

My invention comprises a small cryogenic capsule probe which can be inserted into a body opening or conduit and positioned against tissue, as inside an intestine. The capsule probe casing is hollow and attached tubes circulate a cooling gas through the casing to cool it and to thereby cool or freeze tissue in contact with the outer-surface of the casing. The instrument can immobilize a gross tumor and its component cellular elements.

In the drawing:

FIGURE 1 is a side view of the capsule probe positioned in a body conduit such as an intestine, the intestine being shown in section.

FIGURE 2 is a side section through the capsule shown in FIGURE 1.

FIGURE 3 is a sectional view taken along the line 3—3 of FIGURE 2.

FIGURE 4 is a side section of a different embodiment wherein only one half of the capsule is cooled.

FIGURE 5 is a sectional view taken along the line 5—5 of FIGURE 4.

FIG. 6 is a side section of a capsule embodiment wherein one gas tube is concentrically contained inside the other.

FIGURE 7 is a sectional view taken along the line 7—7 of FIGURE 6.

FIGURE 8 is a side elevation view of the capsule with a temperature sensing element thereon, with the temperature indicating means shown diagrammatically.

FIGURE 9 is a sectional view taken on line 9—9 of FIG. 8.

FIGURE 10 is a sectional view taken on line 10—10 of FIGURE 8.

FIGURE 11 is a side elevation view of the capsule showing lamp elements thereon.

FIGURE 12 is a sectional view taken on line 12—12 of FIGURE 11.

FIGURE 13 is a side elevation view of the capsule showing elements with radioactive particles thereon on the capsule.

FIGURE 14 is a sectional view taken on line 14—14 of FIGURE 13.

In FIGURE 1 the capsule probe casing 10 is shown inside a body conduit 12 having a malignant portion 14. Cooling fluid is introduced inside the casing 10 through an inlet tube 16 and exhausted through an outlet tube 18. Suitable insulation, not shown, surrounds these tubes. Each tube is provided with a disconnecting coupler 20. In the section view of FIGURES 2 and 3 can be seen the interior cooling coil 22 which circulates fluid through the interior of the capsule probe casing 10. In use the capsule probe casing 10 with tubes 16 and 18 attached is inserted into the body conduit 12 through an external opening, i.e., the anus, or by cutting or slitting the conduit to permit the insertion. The capsule probe casing 10 is then manipulated through the conduit 12 until it is inside the malignant area 14, being positioned by feel or visually or by X-ray or the like.

Cooling fluid is then introduced into the cooling coil 22 inside the casing 10 through tube 16 and exhausted from it through tube 18. After the desired degree of cooling or freezing is achieved the necessary cutting is done to remove the malignant area 14. This cutting and removal can be done with conventional surgical instruments or with cryogenic cutting instruments as described in copending application Serial No. 134,733. While the capsule probe 10 can be drawn back through the conduit 12 to the point of insertion by pulling on the tubes 16 and 18 after the flow of cooling fluid has been stopped, the optional couplings 20 permit removing the capsule probe casing 10 through the opening left by the cutting away of the malignancy 14. The tubes 16 and 18 can be disconnected and only the tubes need be drawn back through the conduit 12 to the point of insertion.

In the embodiment shown in FIGURES 4 and 5 only a portion of the capsule probe casing 10 contains interior coils 22, the other portion of the casing 10 being filled with insulation 24. This permits cooling or freezing only a portion of the conduit 12 rather than the entire outer surface and can be used where the malignant portion 14 is confined to a small area. Small orientation bumps 26 on the portion of the casing 10 containing the interior cooling coils 22 permit the surgeon to position the cooling portion of the casing 10 adjacent to the malignancy. The inlet and outlet tubes 16 and 18 and the disconnecting coupler 20 can be used as in the other embodiment.

The embodiment shown in FIGURES 6 and 7 differs in the manner in which the cooling fluid is introduced into, circulated through and exhausted from the capsule probe casing 10. An inner inlet tube 30 and an outer exhaust tube 32 are employed. The inner inlet tube 30, through which cooling fluid is introduced extends well into the capsule probe casing 10. The outer outlet tube 32 terminates just inside the capsule probe casing 10 and the cooling fluid is exhausted from the casing 10 through the annular space 34 between the inner inlet tube 30 and the outer outlet tube 34. Spacing struts 36 maintain the annular space 34 between the two tubes. A concentric connecting coupler 38 permits detaching the capsule probe casing 10 from tubes 30 and 32. It is also possible to use the annular space 34 to introduce the cooling fluid into the casing 10 and the inner tube 30 to exhaust it from the casing 10.

Although omitted from the drawing for clarity, it is to be understood that the tubes 16, 18, 30 and 32 are preferably covered on the outside with an insulating material such as silk, plastic or the like. The tubes themselves can be of any suitable material such as plastic or metal. As the tubes should ordinarily be quite flexible, plastic, such as polyethylene or the like, is the preferred material. In the embodiment shown in FIGURE 5 that portion of the inner inlet tube 30 extending inside the casing is preferably made of a stiff material, rather than being flexible like the portion of the tube outside the casing. This insures even distribution of the incoming cooling fluid.

The connecting coupler 38 can be of any design which, without undue bulk, permits rapid disconnection of the tubes when cold. For example, a threaded connecting fitting similar to a pipe coupling or union, suitably gasketed, could be employed. The gasketing should be of a resilient material such as a silicon rubber to insure a fluid-tight seal.

In the embodiment shown in FIGURE 2 the coils within the casing can be of any desired configuration such as to achieve maximum heat transfer through the casing of the probe. The coils can be made of metal or of any material with the desired rigidity and heat transfer properties. A heat transfer fluid or material can be inserted into the casing to fill the space not occupied by the coils and promote heat transfer through the casing. The insulation in the embodiment in FIGURE 4 can be any suitable insulating material such as ceramic, plastic or the like.

As it is desirable to know the degree of cooling or freezing achieved at all times a temperature sensing device such as a thermocouple 39 such as is shown in FIGS. 8–10 can be mounted on the inner or outer surface of the casing with wires 40 running back with the fluid tubes to a point outside the body where the temperature can be read on an indicating device 41. To facilitate precise determination of the location of the probe within the body when it cannot be seen, i.e., inside an intestine, a light emitting source, such as a light bulb 42 such as is shown in FIGS. 11 and 12, or a source of phosphorescence, can be attached to the probe. A source of radioactivity 43 can be similarly employed as shown in FIGS. 13 and 14.

The cooling fluid is circulated through the interior of the probe casing by a positive pressure. The particular cooling fluid employed is not critical, except that it must be cold enough to achieve the degree of cooling or freezing desired. Any cooling liquid or gas which is sufficiently cold can be employed. The so-called "cryogenic fluids" are particularly suited for some applications. These include liquid argon, liquod fluorine, liquid helium, liquid hydrogen, liquid neon, liquid nitrogen, liquid oxygen and liquid methane. Other suitable fluids include liquid carbon dioxide. The gaseous or partially gaseous state of all of the above fluids may also be used. Liquids which in the gaseous state are explosive, such as hydrogen, oxygen and methane must be handled with extra care and under conditions which minimize the danger of explosion.

While the capsule probe has been described in the drawings as cylindrical in shape with rounded closed ends, the exact shape is not critical. Thus it could be round, elliptical, oval, relatively flat, etc., depending on the particular part of the body to be treated. It is preferred that the outer casing of the probe have no sharp corners or protrusions, to avoid tearing or damaging tissue. When the probe, which is non-expansible, is intended to be inserted into an intestine or other conduit of the body, it should be of proper size to achieve maximum contact with the tissue walls. In some cases it may be desirable to use a clamp on the outside of the body conduit to bring the walls in contact with the probe. Such a clamp can itself be cooled if desired. This is particularly true in the case of the intestines which have a corrugated configuration and are preferably contacted by the probe to insure proper cooling or freezing.

The outer shell can be made of any material that will transfer heat readily. While metal such as stainless steel is preferred, other material including plastics can be used provided heat transfer through the material is sufficient to achieve cooling or freezing. For most applications a very smooth outer surface is desirable to insure ready passage of the probe through the body and minimize sticking to tissue. To help achieve this a thin skin or coating of a material such as a silicone or Teflon type plastic can be applied over the outer casing. The outer surface can also be lubricated with a suitable material such as petroleum jelly or the like to ease the passage of the probe through the body and to minimize adhesion of tissue to the casing during cooling or freezing.

The instrument has been described with particular reference to its use in sounding and cooling or freezing portions of the intestines. It is to be understood that it is useful generally in the alimentary tract. With the shape of the casing varied as required the instrument can be used in freezing other portions of the interior or exterior of the body, such as the esophagus and the larynx. It can also be used to cool or freeze lobes of the lung by inserting it through the trachea. It can also be used to cool or freeze other conduits or areas of the body such as blood vessels.

It is recommended that the surgeon or person handling the probe and removing frozen tissue wear insulated protective gloves. Also, insulating pads should be used in the body cavity and inserted around the area to be frozen to prevent its sticking to surrounding tissue.

The degree of cold required to achieve statis will vary with the type of tissue. With tissue such as the mucous membrane, a temperature between about 0° and −3° C. may be sufficient while tissue such as muscle may require −8° C. or lower. At temperatures much below about −10° C. irreversible change occurs in the tissue morphology with destruction of the component cells. If post surgical biopsy of the malignant area being removed is desired, or if heaalthy tissue which is not being removed is also frozen, such lower temperatures should be avoided. In achieving stasis the time of the instrument is held against the tissue, that is, the time that heat is withdrawn from the tissue, is also quite important. This may vary from a few seconds to a minute or more, depending on the type of tissue, temperature of the instrument and degree of stasis required. In use the capsule can be permitted to warm after the dissection is complete, and the warming assisted with heating means if desired, to facilitate uncoupling of the connecting tubes and thermocouple wires from the capsule.

What is claimed is:

1. A capsule probe for insertion into a human or animal body comprising an elongated hollow casing of substantially rigid material and having a blunt rounded forward end and a rounded rear end, flexible insulated cryogenic fluid conduit means extending into the rear end of said hollow casing and comprising tubing for leading cryogenic fluid into the casing and tubing for exhausting cryogenic fluid from the casing, said conduit means being substantially less in cross-sectional size than said casing and being substantially uniform in diameter along its entire length, and cryogenic fluid distribution means within said hollow casing and comprising cooling coil means connected to said cryogenic fluid tubing and extending along at least a portion of the length of said hollow casing and adjoining said wall of said casing and directing a flow of cryogenic fluid along said length of the inside surface of the wall of the casing for producing uniform cooling of the said portion of the length of the wall.

2. A capsule probe as claimed in claim 1 in which said cooling coil means comprises a helical coil having an exterior diameter substantially the same as the interior diameter of the casing and extending along the entire length of the casing.

3. A capsule probe as claimed in claim 1 in which said cooling coil means comprises a helical coil having an exterior diameter about half that of the interior diameter of the casing and extending along the entire length of the casing, about one half of the cross sectional area of the casing being filled with an insulating material extending the length of the casing.

4. A capsule probe as claimed in claim 1 in which the exterior of said casing has at least one raised button thereon for facilitating the location of the capsule in a body cavity by touch.

5. A capsule probe as claimed in claim 1 in which said cryogenic fluid conduit means includes quick disconnect couplings in said tubings.

6. A capsule probe as claimed in claim 1 and a source of light mounted on said casing.

7. A capsule probe as claimed in claim 1 and a source of radioactivity mounted on said casing.

8. A capsule probe as claimed in claim 1 and a temperature sensing means on said casing and a temperature indicating means adapted to be positioned outside the body into which the capsule probe is inserted and connected to said temperature sensing means.

References Cited by the Examiner
UNITED STATES PATENTS

| | | | |
|---|---|---|---|
| 1,327,207 | 1/1920 | Lidberg | 128—401 X |
| 1,970,200 | 8/1934 | Short | 128—399 X |
| 2,069,284 | 2/1937 | Solomon | 128—401 |
| 2,190,383 | 2/1940 | Newman | 128—401 |
| 2,192,768 | 3/1940 | Cross | 128—401 |
| 2,346,245 | 4/1944 | Zichlin | 128—401 |
| 2,466,042 | 4/1949 | Reich | 128—401 |
| 2,533,955 | 12/1950 | Pitts | 128—401 X |
| 2,547,886 | 4/1951 | Poux | 128—402 X |
| 3,075,517 | 1/1963 | Morehead | 128—24.1 |

OTHER REFERENCES

"Cooling Cannula" by G. R. Rowbothan et al., pp. 12–15 of Lancet for Jan. 3, 1959.

RICHARD A. GAUDET, *Primary Examiner.*

LOUIS R. PRINCE, *Examiner.*

SIMON BRODER, *Assistant Examiner.*